Figure 1:
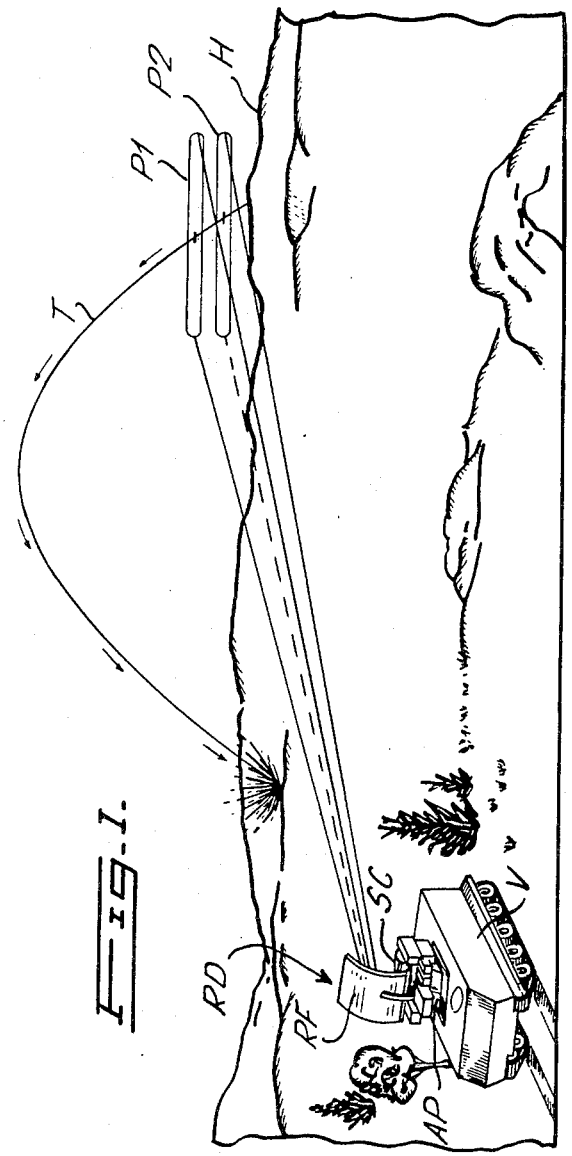

May 4, 1965 A. HENDRY ETAL 3,182,309
ECHO IDENTIFICATION IN DUAL BEAM RADAR DISPLAY
Filed April 1, 1963 3 Sheets-Sheet 2

United States Patent Office 3,182,309
Patented May 4, 1965

3,182,309
ECHO IDENTIFICATION IN DUAL BEAM
RADAR DISPLAY
Archibald Hendry, William C. Brown, and Eric F. V.
Robinson, Ottawa, Ontario, Canada, assignors to National Research Council, Ottawa, Ontario, Canada, a body corporate
Filed Apr. 1, 1963, Ser. No. 269,432
Claims priority, application Canada, Oct. 19, 1962, 860,467
4 Claims. (Cl. 343—5)

This invention relates to a radar system and method, for use in locating enemy weapons by obtaining echoes from the projectiles fired by such weapons.

The invention is concerned with a radar system for determining at least two points through which a projectile passes, the system including a computer for determining the point of intersection of the trajectory of the projectile with the ground from two of such determined points. Such a system is of particular utility when the weapon is hidden from direct visual or radar observation.

The radar system is equally useful for watching friendly projectiles aimed at the enemy weapon and for determining the points of impact or burst of such friendly projectiles by making the same extrapolation on the trajectory of a falling projectile as for a rising projectile. The point to be located (usually on the ground) through which such trajectory extends (whether for a rising or falling projectile) is called the target point. In the general case, the "target point" is the point of intersection of the projectile trajectory with a selected plane referred to as the "working plane." The "working plane" is defined as the one including the line between the radar system and the target point and all horizontal lines perpendicular to said line. The angle of the working plane will generally be chosen to give a ground location for the "target point" unless tactics otherwise demand.

Such a system is described in W. C. Brown et al. United States patent application Serial No. 269,367 filed April 1, 1963. This application describes a system the antenna of which provides a narrow beam substantially circular in cross-section having a width of approximately 16 mils (approximately 1°, a mil being 360°/6400) in both directions. The system causes this narrow beam to scan horizontally through approximately 400 mils (22.5°) alternately in two planes separated in angle by approximately 40 mils (2.25°) at beam centres. This action defines, by the narrow beam locus, two vertically superposed, generally horizontal, fan-shaped beams, each scanned 20 times per second, hereinafter referred to as the upper and lower beams.

Echoes (intercepts) received from each of the upper and lower beams when a projectile passes through it, are displayed on a range-azimuth radar display in two series (one for each of said beams). The duty of the operator is to observe or mark the centre points of the leading edges of the first and last echoes received in each of the upper and lower beams and to estimate and mark the mean points between each pair of these two extreme centre points. The radar screen is provided with an outer surface that can readily be marked by the operator using a suitable stylus. Having marked the mean centre points on the screen, the operator then feeds information concerning the positions of these points into a computer which calculates an extrapolated target point on the working plane through which the projectile trajectory passes. The computer displays the position of this target point in counters as representing the position of the weapon. During the course of this operation, the operator normally also determines ΔT, the time between the projectile being in similar positions in each of the upper and lower beams. Such similar positions can conveniently be the points of entry of the projectile into each of said beams.

As above mentioned, the system may be used for observing rising projectiles (normally enemy) or falling projectiles (normally friendly). In a modification to the basic system, described in Clemence et al., United States patent application Serial No. 269,284 filed April 1, 1963, a method is disclosed of observing both rising and falling projectiles during the same period of operation, means being provided to indicate in the radar system the differences between the coordinates of the various target points computed. Such differences are conveyed to the friendly gunners to enable them to correct their fire to direct it more accurately onto the enemy weapon. When using the radar system in this way, it is necessary for the operator to be able to distinguish the echoes on his screen received from falling projectiles from those received from rising ones. Since falling projectiles will pass first through the upper beam and then through the lower beam, while rising projectiles will pass through the beams in the reverse order, the necessary identification can always be made, if the operator is able to recognize those echoes which are returned in each of the respective beams.

He can make the assumption that the enemy weapon is firing generally towards the radar system and that friendly fire is directed generally away from the radar system. Identification is then possible by a range comparison, since the echoes returned in the upper beam will always be of shorter range than those returned in the lower beam, regardless of whether the projectile is rising or falling.

Such an assumption is often justified, in which case no further means for identification is needed. There will be occasions, however, when such an assumption would be untrue. The primary object of the present invention is to provide means, for incorporation into a radar system of the general type already described, that will provide positive identification of the echoes returned in one of the beams. The operator then has a sure method of distinguishing a rising from a falling projectile regardless of the direction of its horizontal component of velocity relative to the radar system.

This object is achieved by a radar system comprising
(a) Means for producing a plurality of radar beams,
(b) Means synchronised with said producing means for generating separate sweep signals corresponding to each of said beams,
(c) A radar display connected to said generating means to receive said sweep signals therefrom,
(d) Means for transmitting to said display echo signals returned in each of said beams,
(e) And means responsive to one of said sweep signals for producing delayed identification signals corresponding to and in predetermined timed relation to the echo signals in a selected one of said beams, and for passing said identification signals to said display.

Figure 2:
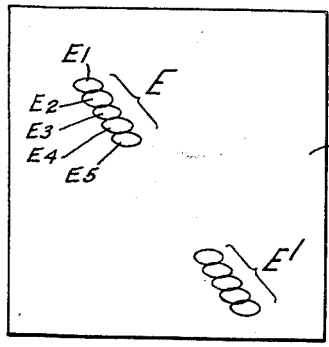
Figure 5:
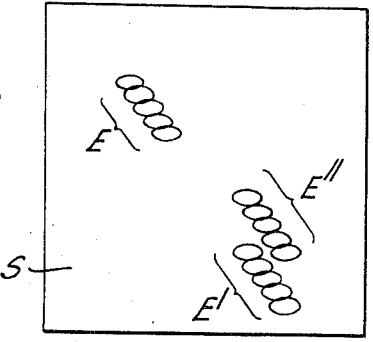
Figure 3:
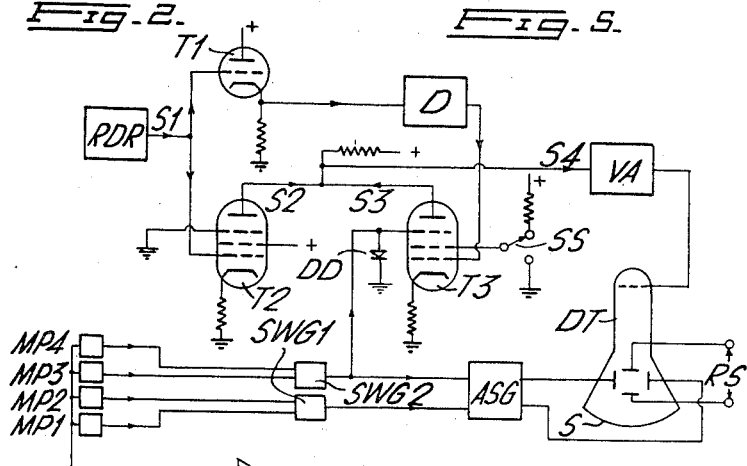
Figure 4:
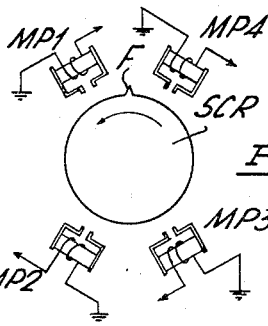
Figure 6:
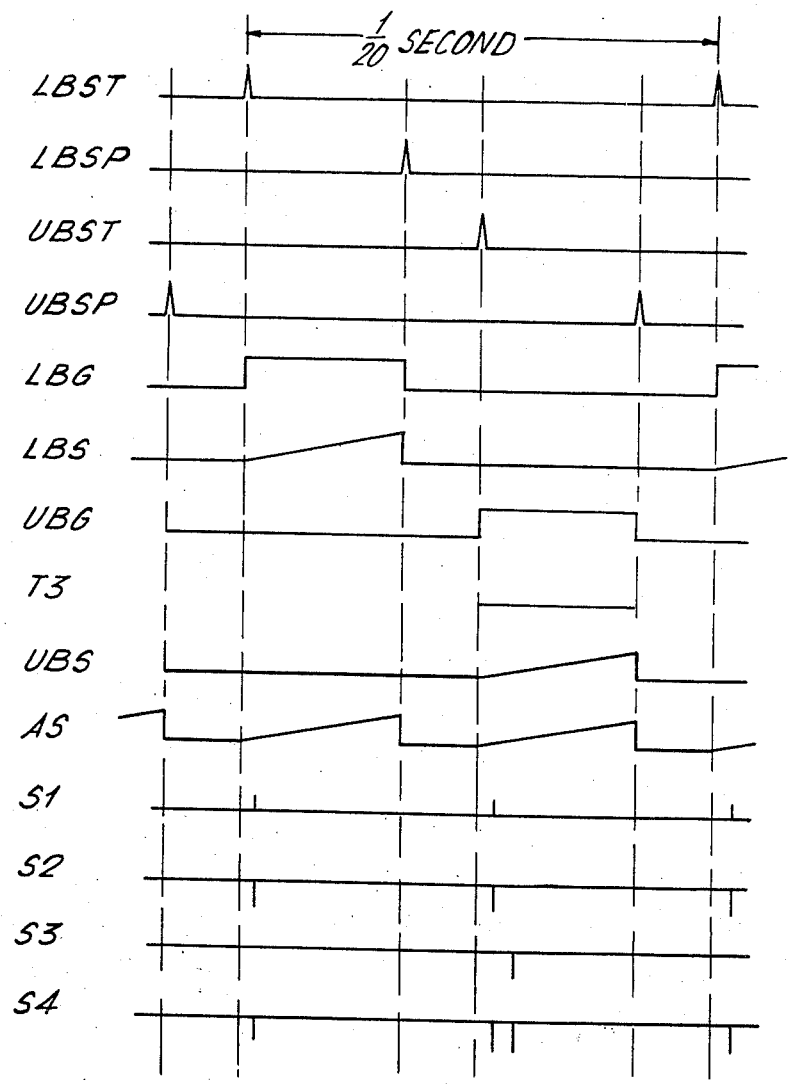

One manner of carrying the invention into practice is illustrated diagrammatically in the accompanying drawings. The specific system illustrated is provided by way of example only, the broad scope of the invention being limited only by the appended claims. In these drawings:

FIGURE 1 is a general perspective view of a radar system in operation,

FIGURE 2 is an illustration of typical series of echoes displayed on the radar screen, FIGURE 3 is a part of the receiving circuit of the radar system modified in accordance with the present invention, FIGURE 4 is a diagrammatic illustration of a fragment of the antenna assembly of the radar system, FIGURE 5 is a view similar to FIGURE 2 showing how the display is modified by the apparatus of FIGURES 3 and 4, and FIGURE 6 is a time sequence diagram.

Overall system (FIGURE 1)

FIGURE 1 shows the radar system RD mounted on a vehicle V being used to observe the trajectory T of a projectile fired by a mortar positioned out of direct visual or radar range behind hills H. The antenna system of the radar system RD provides a narrow beam substantially circular in cross-section having a width of approximately 16 mils (approximately 1°) in both directions. The system causes this narrow beam to scan horizontally through approximately 400 mils (22.5°) alternately in two planes P1 and P2 separated in angle by approximately 40 mils (2.25°) at beam centers. This action defines, by the narrow beam locus, two vertically superposed, generally horizontal fan-shaped beams, each scanned 20 times per second, hereinafter referred to as the upper and lower beams. This effect is achieved by use of a Foster type scanner SC similar to that disclosed in Foster U.S. Patent No. 2,832,936, issued April 29, 1958, and modified to provide a dual beam in a manner similar to that described in "Mobile Radar Pinpoints Enemy Mortar Positions," by M. S. Jaffee et al., "Electronics," September 18, 1959, page 34 et seq. The scanner SC is placed at the focus of a semi-parabolic cylinder RF which reflects two focused beams. The scanner SC and reflector RF are mounted as an assembly on an antenna platform AP on the vehicle V, which platform is maintained horizontal at all times (see United States patent application No. 269,363, filed April 1, 1963). The scanner-reflector assembly can be inclined relative to this horizontal platform AP to alter the angle of the beams as a pair while maintaining constant their angular separation. The limits of this adjustment may for practical purposes be set at 212 mils (12°) above the horizontal to 106 mils (6°) below the horizontal, these angles being between the horizontal and the centre of the lower beam plane P2. The antenna assembly can be rotated to provide complete coverage through 6400 mils (360°) in azimuth.

Echo display (FIGURE 2)

As a projectile enters the field of scan of the lower beam, an echo E1 is displayed on the screen S by a group of individual signal returns resulting from a single passage of the narrow beam across the projectile. The centre of the leading (lower) edge of this echo represents the true position of the object (projectile) being observed. As the beam continues to sweep, a series of such echoes E1 to E5 appears on the screen S. This series of individual echoes makes up the composite echo E of FIGURE 2. In reality there may be many more than the five individual echoes shown. Some fading of the earlier echoes will have taken place by the time the last echo appears, but they are all shown simultaneously and enlarged from their true size in FIGURE 2 for ease of illustration. The duty of the operator is to observe or mark the center points of the leading edges of the first and last echoes and to estimate the mean point between these two extreme center points. The screen S is provided with an outer surface that can readily be marked by the operator using a suitable stylus.

Assuming that an enemy weapon is firing from left to right and towards the radar system RD, a further series of echoes is detected a few moments later by the upper beam, being shown as composite echo E' in FIGURE 2. The echoes of this second series will similarly have leading edge centre points, the mean point of which is determined and marked on the screen by the operator. The upper beam echoes will appear in a lower position on the screen S than the lower beam echoes when the weapon is firing towards the radar system, since the range will have shortened somewhat by the time the projectile reaches the upper beam. If the weapon is firing away from the radar system, the upper beam echoes will appear above the lower beam. Since the upper beam echoes appear first for a falling projectile and second for a rising projectile, the operator is unable to be sure which series (and hence which marked centre point) corresponds to which beam. It is necessary, however, for him to have this knowledge in order for him properly to feed into the computer the information he has obtained.

For feeding the computer, the screen S is provided with a marker spot, which is an electronic marker produced by conventional circuitry in the radar transmitter-receiver combination and synchronised with the scope sweep so as to occupy a single desired position on the screen S determined horizontally by an azimuth marker handwheel and vertically by a range marker handwheel. The operator first moves the marker spot to coincide with the mean point of the lower beam and when he has achieved this coincidence he presses a foot switch to actuate the computer. After closing this switch the operator moves the marker spot to the mean point of the upper beam. In this way the operator feeds into the computer the difference in range and the difference in azimuth between these two mean points. It is essential, however, that the operator move the marker spot from the lower beam point to the upper beam point, and not vice versa: hence the need to know which is the lower beam echo series. If visual observation or the tactical situation does not establish beyond doubt the direction in which the weapon is firing, other means for identifying the echo series are required, and an example of such means is illustrated in FIGURES 3 and 4.

Echo identification circuit and time sequence (FIGURES 3, 4 and 6)

FIGURE 3 illustrates a part only of the overall radar receiving circuits. The remainder of these circuits, which is conventional in form, is shown as a block RDR emitting a signal S1.

FIGURE 4 shows the antenna scanner rotor SCR which is fitted with a peripherally projecting finger F which, during each rotation of the scanner (1/20 of a second), sequentially actuates magnetic pulsers MP1, MP2, MP3 and MP4, which gate a pair of square wave generators SWG1 and SWG2 in the following sequence: to start the lower beam (pulser MP1); to stop the lower beam (pulser MP2); to start the upper beam (pulser MP3) and finally to stop the upper beam (pulser MP4). These events, which serve to synchronise the azimuth sweep signals supplied to the display tube DT with the antenna scanner and hence with emission of the respective beams, are illustrated in the time sequence diagram of FIGURE 6 as, respectively, LBST, LBSP, UBST and UBSP. In practice the active time defined by the displacement between pulsers MP1 and MP2 (or MP3 and MP4) would be considerably greater, e.g. ten or twenty times, than the dead time defined by the displacement between pulsers MP2 and MP3 (or MP4 and MP1).

Square wave generator SWG1 controlled by pulsers MP1 and MP2 sends a lower beam gating signal LBG to an azimuth sweep generator ASG which emits a conventional saw-tooth lower-beam azimuth-sweep signal LBS. Similarly, the square wave generator SWG2 controlled by pulsers MP3 and MP4 sends an upper beam gating signal UBG to the sweep generator ASG to cause it to emit a saw-tooth upper-beam azimuth-sweep signal UBS. Azimuth sweep signal AS, which is the combination of signals LBS and UBS, is applied to the display tube DT.

A range sweep is applied across terminals RS by conventional circuits to form conventional 8000 cycle per second lines.

Each echo signal S1 is applied to the control grid of a pentode T2 to emerge as an amplified signal S2. Signal S1 also passes through cathode follower tube T1 and a conventional delay device D to the control grid of a second pentode T3 to emerge as an amplified and delayed signal S3, when tube T3 is conducting. Signals S2 and S3, combined as signal S4, are amplified into video amplifier VA and applied to the grid of the display tube DT.

Signal S3 appears except when pentode T3 is cut-off by the biasing of its suppressor grid by the negative portion of the square wave produced by generator SWG2. FIGURE 6 shows by line T3 the period during which this pentode is conducting. During this period diode DD maintains the suppressor of pentode T3 at ground potential.

As a result, signal S3 appears on the screen S as a second or delayed echo for each of signals S2 returned in the upper beam, but not for those in the lower beam. The result is a delayed echo series E" for the upper beam only, thus providing positive identification of this beam. If preferred, the lower beam echo series can be identified by a delayed identification series, this being achieved by connecting the pentode T3 to the output of square wave generator SWG1 instead of to the output of square wave generator SWG2.

It is important that the time constant of the signal circuits between pentode T3 and display tube DT be chosen sufficiently small that the gating wave form UBG does not appear as a signal at the display tube. Such a choice does not impose any real limitation, since the signals to be identified are always very much shorter in time than the gating signal UBG.

It has been been implied that the wave form of the identifying signals S3 is the same as that of the echo signal S2. However, the wave form of the signals S3 may be changed from that of signals S2 by conventional means incorporated in the delay device D, thus permitting the identification signals to be readily recognised and distinguished from any other echoes that may be present on the display in the same vicinity.

To turn off the identification means, a switch SS is moved to the lower position shown in FIGURE 3, thus grounding the screen grid of the switching pentode T3 and rendering it non-conducting regardless of the potential existing on its suppressor grid.

We claim:
1. A radar system comprising
   (a) means for producing a narrow radar beam and for continuously repetitively and rapidly scanning said beam in a plurality of arcs to form effectively a plurality of radar beams,
   (b) means synchronised with said scanning means for generating separate sweep signals corresponding to each of said beams,
   (c) a radar display connected to said generating means to receive said sweep signals therefrom,
   (d) means for transmitting to said display echo signals returned in each of said beams,
   (e) and means responsive to one of said sweep signals for producing delayed identification signals corresponding to and in predetermined timed relation to the echo signals in a selected one of said beams, and for passing said identification signals to said display.

2. A radar system comprising
   (a) means for producing a narrow radar beam and for continuously, repetitively and rapidly scanning said beam horizontally alternately in two closely vertically superposed arcs to form effectively continuous upper and lower beams,
   (b) means synchronised with said scanning means for generating separate azimuth sweep signals corresponding to each of said upper and lower beams,
   (c) a range-azimuth radar display connected to said generating means to receive said sweep signals therefrom,
   (d) means for transmitting to said display echo signals returned by a projectile travelling in a trajectory intersecting said upper and lower beams,
   (e) and means responsive to one of said sweep signals for producing delayed identification signals corresponding to and in predetermined timed relation to the echo signals in one only of said upper and lower beams, and for passing said identification signals to said display.

3. A radar system according to claim 1, wherein said means for producing delayed identification signals corresponding to the echo signals, include means for modifying the wave form of said identification signals to render them readily distinguishable on the display from the echo signals.

4. A radar system comprising
   (a) means for producing a narrow radar beam and for continuously, repetitively and rapidly scanning said beam horizontally alternately in two closely vertically superposed arcs to form effectively continuous upper and lower beams,
   (b) means synchronised with said scanning means for generating separate azimuth sweep signals corresponding to each of said upper and lower beams,
   (c) a range-azimuth radar display connected to said generating means to receive said sweep signals therefrom,
   (d) a circuit including a pair of electron tubes each connected to receive, as input, all echo signals returned by a projectile travelling in a trajectory intersecting said upper and lower beams, and to transmit corresponding output signals to said display,
   (e) said circuit including a delay device connected in series with a selected one of said tubes so that the output signals of said selected tube are delayed a predetermined time in relation to the output signals of the other said tube,
   (f) and means responsive to one of said sweep signals for rendering said selected tube conducting during scanning in a selected one of said upper and lower beams and for rendering said selected tube non-conducting during scanning in the other one of said upper and lower beams.

References Cited by the Examiner
UNITED STATES PATENTS
2,939,133   5/60   De Witt _____ 343—11

CHESTER L. JUSTUS, *Primary Examiner.*